(12) United States Patent
Berger et al.

(10) Patent No.: US 11,748,266 B1
(45) Date of Patent: Sep. 5, 2023

(54) SPECIAL TRACKING POOL ENHANCEMENT FOR CORE LOCAL CACHE ADDRESS INVALIDATES

(71) Applicant: INTERNATIONAL BUSINESS MACHINES CORPORATION, Armonk, NY (US)

(72) Inventors: Deanna Postles Dunn Berger, Hyde Park, NY (US); Gregory William Alexander, Pflugerville, TX (US); Richard Joseph Branciforte, Austin, TX (US); Aaron Tsai, Hyde Park, NY (US); Markus Kaltenbach, Tübingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/686,477

(22) Filed: Mar. 4, 2022

(51) Int. Cl.
  *G06F 12/08* (2016.01)
  *G06F 12/0891* (2016.01)
  *G06F 12/0837* (2016.01)
  *G06F 12/084* (2016.01)

(52) U.S. Cl.
  CPC ........ *G06F 12/0891* (2013.01); *G06F 12/084* (2013.01); *G06F 12/0837* (2013.01); *G06F 2212/62* (2013.01)

(58) Field of Classification Search
  CPC ............. G06F 12/0891; G06F 12/0837; G06F 12/084; G06F 2212/62
  See application file for complete search history.

(56) References Cited

U.S. PATENT DOCUMENTS

| | | |
|---|---|---|
| 5,193,163 A | 3/1993 | Sanders et al. |
| 5,553,263 A | 9/1996 | Kalish et al. |
| 7,996,621 B2 | 8/2011 | Brown et al. |
| 8,301,839 B2 | 10/2012 | Sundarrajan et al. |
| 10,055,349 B2 | 8/2018 | Ren et al. |
| 10,241,945 B2 | 3/2019 | Guthrie et al. |
| 10,795,824 B2 | 10/2020 | Berger et al. |
| 10,977,040 B2 | 4/2021 | Cuffney et al. |
| 2011/0320722 A1* | 12/2011 | Dunn Berger ...... G06F 12/0855 711/E12.017 |
| 2014/0052933 A1* | 2/2014 | Mace .................. G06F 12/0835 711/146 |

(Continued)

OTHER PUBLICATIONS

International Search Report and Written Opinion for International Application No. PCT/CN2023/079251; International Filing Date: Mar. 2, 2023; dated May 19, 2023; 8 pages.

*Primary Examiner* — Masud K Khan
(74) *Attorney, Agent, or Firm* — CANTOR COLBURN LLP; Nathan Rau

(57) ABSTRACT

Embodiments are for special tracking pool enhancement for core L1 address invalidates. An invalidate request is designated to fill an entry in a queue in a local cache of a processor core, the queue including a first allocation associated with processing any type of invalidate request and a second allocation associated with processing an invalidate request not requiring a response in order for a controller to be made available, the entry being in the second allocation. Responsive to designating the invalidate request to fill the entry in the queue in the local cache, a state of the controller that made the invalidate request is changed to available based at least in part on the entry being in the second allocation.

20 Claims, 10 Drawing Sheets

(56) References Cited

U.S. PATENT DOCUMENTS

| | | |
|---|---|---|
| 2014/0258635 A1 | 9/2014 | Hong et al. |
| 2014/0325145 A1* | 10/2014 | Sampathkumar ....... G06F 11/00 |
| | | 711/136 |
| 2016/0323407 A1 | 11/2016 | Darias et al. |
| 2017/0139834 A1* | 5/2017 | Gupta ................. G06F 12/0891 |
| 2018/0157967 A1* | 6/2018 | Henry .................... G06N 3/063 |
| 2019/0213135 A1 | 7/2019 | Coe et al. |
| 2019/0294551 A1* | 9/2019 | Abhishek Raja ... G06F 12/1027 |
| 2020/0159665 A1 | 5/2020 | Berger et al. |
| 2020/0278797 A1* | 9/2020 | Bavishi ............... G06F 12/0868 |
| 2020/0356420 A1 | 11/2020 | Winkelmann et al. |

\* cited by examiner

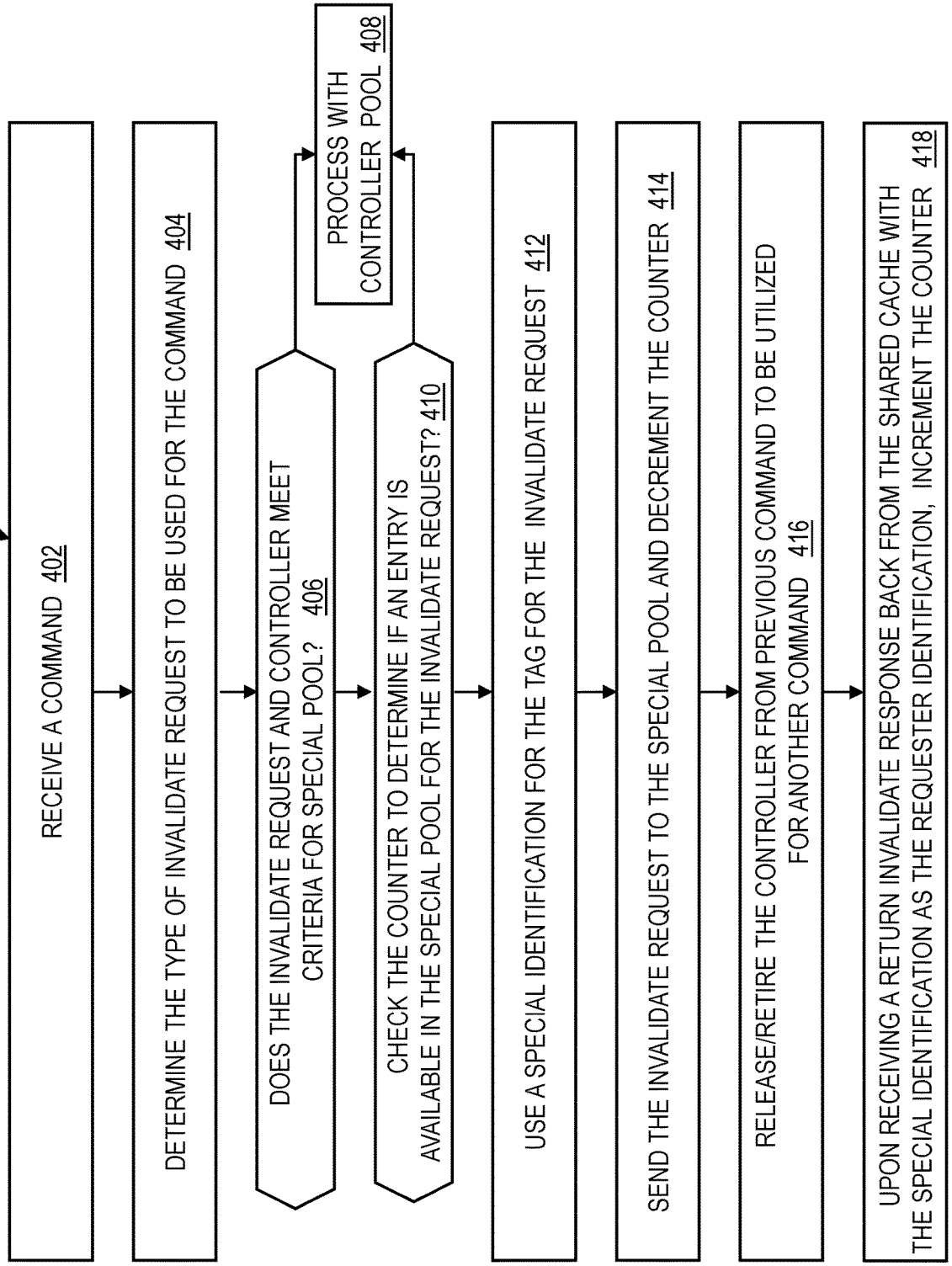

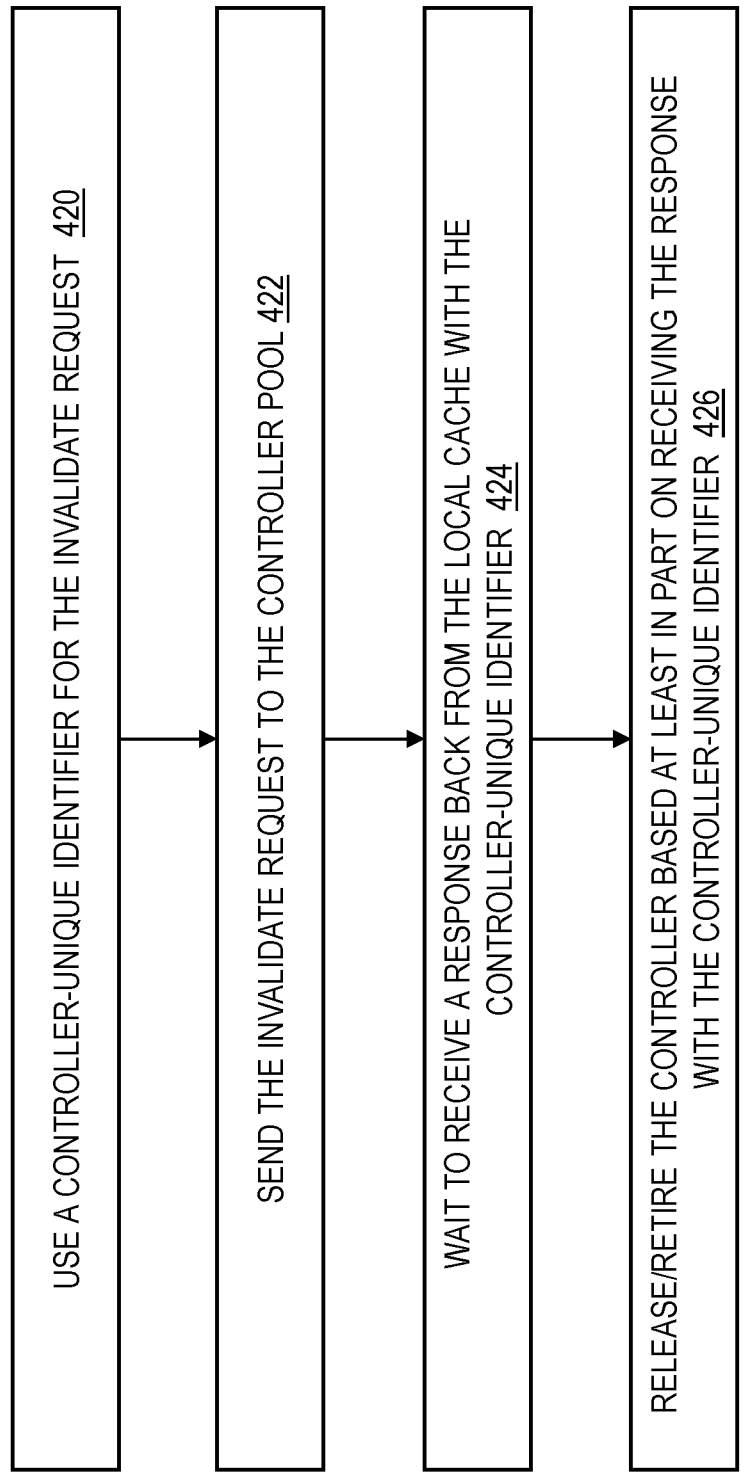

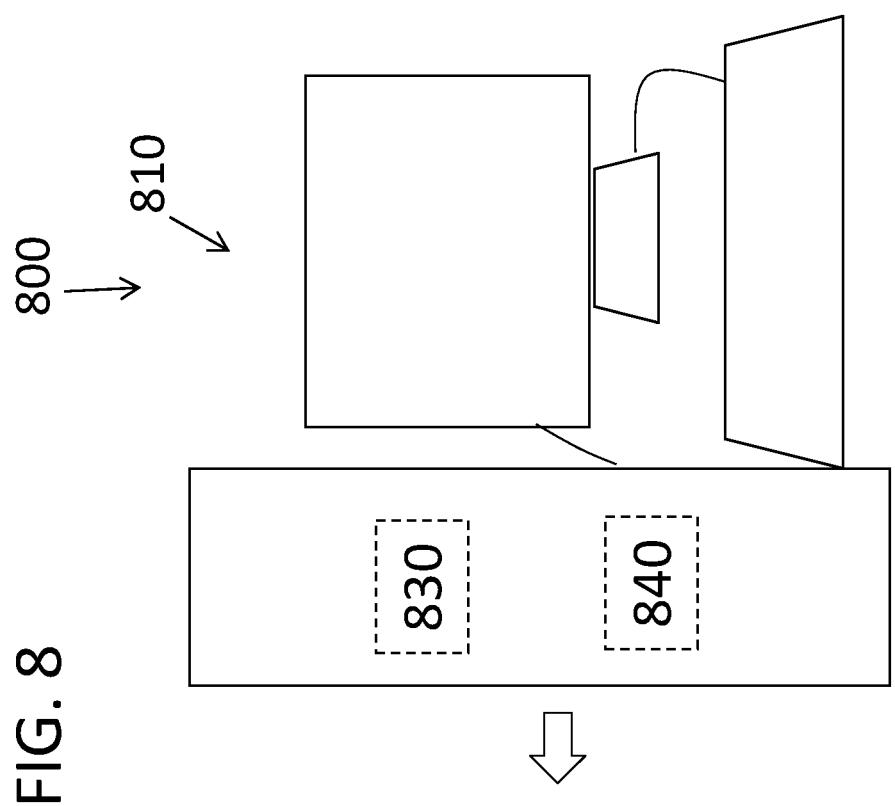
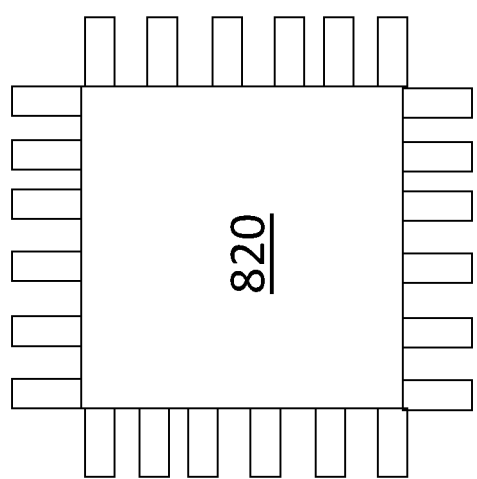
FIG. 8

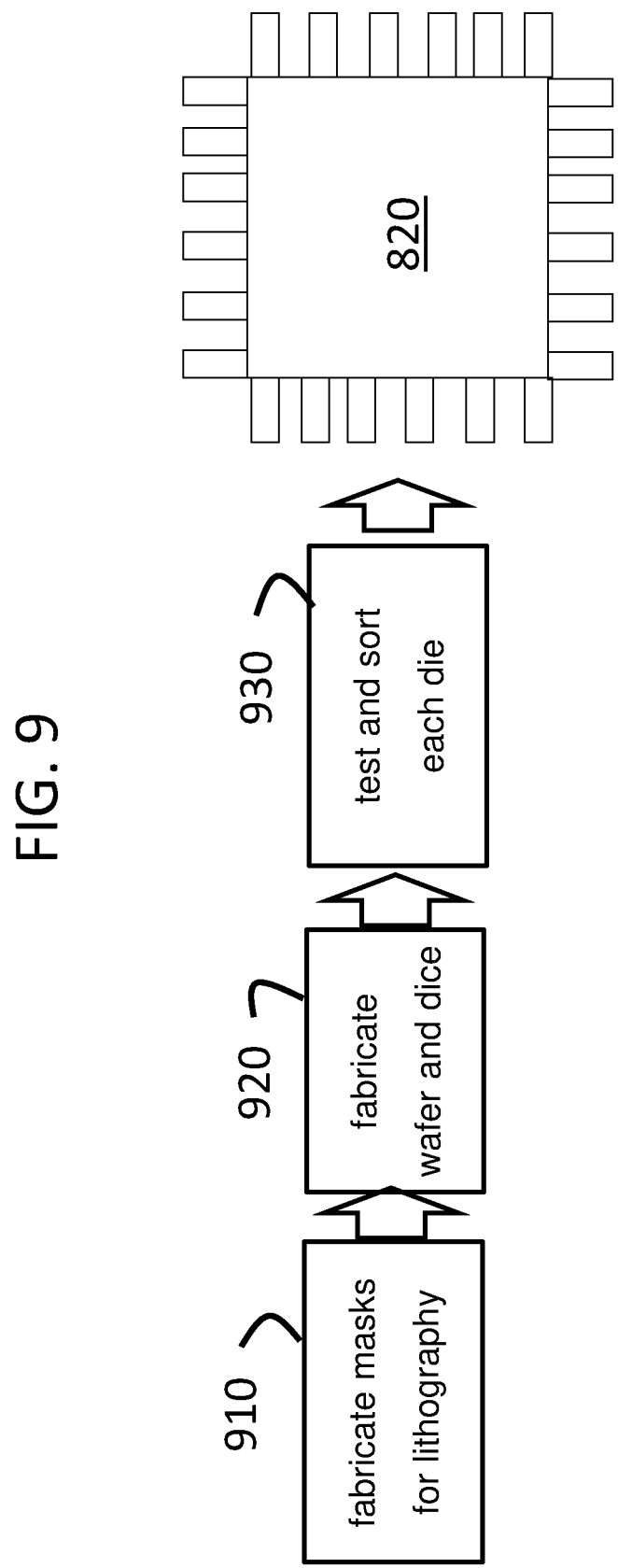

SPECIAL TRACKING POOL ENHANCEMENT FOR CORE LOCAL CACHE ADDRESS INVALIDATES

BACKGROUND

The present invention generally relates to computer systems, and more specifically, to computer-implemented methods, computer systems, and computer program products configured and arranged for using special tracking pool enhancement for core local cache (level one (L1) cache) address invalidates in an integrated circuit (IC).

In computing environments that have multiple processors or cores sharing one or more caches, those processors may have access to the same cache lines. A cache line or line is a portion of data of a specific size (e.g., 256 bytes), which fits into a single cache entry. Coherency is managed on a cache line granularity as data is transferred between memory and a cache. To ensure coherency of the data being transferred, cross-core intervention (also referred to as invalidation or cross-invalidation) is used. Cross-core intervention includes receiving a request for a cache line, determining whether it is owned by a processor, and invalidating the requested cache line if it is owned by the processor prior to providing it to another processor. This protects the data and ensures the data remains coherent, but adds latency to cache accesses.

A cache structure and its related services provide processors and/or processor cores with data consistency of their shared data. As noted above, cross-invalidation is a cache structure mechanism that is used to facilitate cache data consistency. Cross-invalidates are performed as part of cache requests and may be performed synchronously or asynchronously to the completion of a cache request.

Techniques are needed to improve the use of invalidates for caches on an IC.

SUMMARY

Embodiments of the present invention are directed to methods for using special tracking pool enhancement for core local cache (e.g., level one (L1) cache) address invalidates. A non-limiting example method includes designating an invalidate request to fill an entry in a queue in a local cache of a processor core, the queue including a first allocation associated with processing any type of invalidate request and a second allocation associated with processing an invalidate request not requiring a response in order for a controller to be made available, the entry being in the second allocation. The method includes, responsive to designating the invalidate request to fill the entry in the queue in the local cache, causing a state of the controller that made the invalidate request to be changed to available based at least in part of the entry being in the second allocation.

This can provide an improvement over known methods for processing invalidate requests by efficiently allowing hardware controllers to reset and start working on the next fetch without waiting for the local cache (e.g., L1 cache) to send a response back indicating that the invalidate request has been processed. A special pool is utilized which can only process invalidate types that the controller does not have to wait for, such as, for example, read-only invalidates. In one or more embodiments, the special pool may be limited to use for specific performance sensitive hardware controllers. This further has the benefits of keeping the shared cache (e.g., level three (L3) cache) processing fetches more quickly by not having to wait for the local cache (e.g., L1 cache) to respond, especially if the local cache is trying to process numerous invalidate requests.

In addition to one or more of the features described above or below, or as an alternative, in further embodiments of the invention the second allocation in the queue is exclusively used for read-only invalidate requests. One or more embodiments advantageously use the second allocation as a special pool for use with specific performance sensitive hardware controllers, thereby allowing performance sensitive hardware controllers to reset and start working on the next fetch without waiting for the local cache (e.g., L1 cache) to send a response back that the invalidate request has been processed.

In addition to one or more of the features described above or below, or as an alternative, in further embodiments of the invention the first allocation in the queue includes a total number of entries, the total number of entries being greater than or equal to the number of all controllers given access to a shared cache; and a value in a tag is utilized to identify that a corresponding invalidate request for a given controller is for a given entry in the first allocation. One or more embodiments advantageously provide the simplicity of an invalidate queue with one entry per shared cache hardware controller but include the flexibility and performance of a floating queue that can be exclusively utilized by performance sensitive hardware controllers.

In addition to one or more of the features described above or below, or as an alternative, in further embodiments of the invention a first value in a tag is utilized to identify that the invalidate request is for the entry in the second allocation and a different value is utilized for the first allocation. One or more embodiments advantageously denote the second allocation as a special pool for use with specific performance sensitive hardware controllers, thereby allowing the performance sensitive hardware controllers to reset and start working on the next fetch without waiting for the local cache (e.g., L1 cache) to send a response back that the invalidate request has been processed.

In addition to one or more of the features described above or below, or as an alternative, in further embodiments of the invention the first allocation includes a first plurality of entries and the second allocation comprises a second plurality of entries different from the first plurality of entries; and the state of available for the controller permits the controller to perform operations for a subsequent invalidate request, without waiting for a response to the invalidate request from the local cache. One or more embodiments advantageously denote the second allocation as a special pool for use with specific performance sensitive hardware controllers, thereby allowing the performance sensitive hardware controllers to reset and start working on the next fetch without waiting for the local cache (e.g., L1 cache) to send a response back that the invalidate request has been processed.

In addition to one or more of the features described above or below, or as an alternative, in further embodiments of the invention the second allocation is exclusive to controllers designated as performance controllers. One or more embodiments advantageously denote the second allocation as a special pool for use with specific performance sensitive hardware controllers, thereby allowing the performance sensitive hardware controllers to reset and start working on the next fetch without waiting for the local cache (e.g., L1 cache) to send a response back that the invalidate request has been processed.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4A is a flowchart of a process using the special tracking pool enhancement for core local cache (e.g., L1 cache) address invalidates according to one or more embodiments of the present invention;

FIG. 4B is a flowchart of a process using the control pool for core local cache (e.g., L1 cache) address invalidates according to one or more embodiments of the present invention;

FIG. 8 is a block diagram of a system to design/layout of an integrated circuit (IC) using out-of-context timing constraints modification for interior pins of a macro in an IC in accordance with one or more embodiments of the present invention; and FIG. 9 is a process flow of a method of fabricating the IC of FIG. 8 in accordance with one or more embodiments of the present invention.

DETAILED DESCRIPTION

Figure 1:
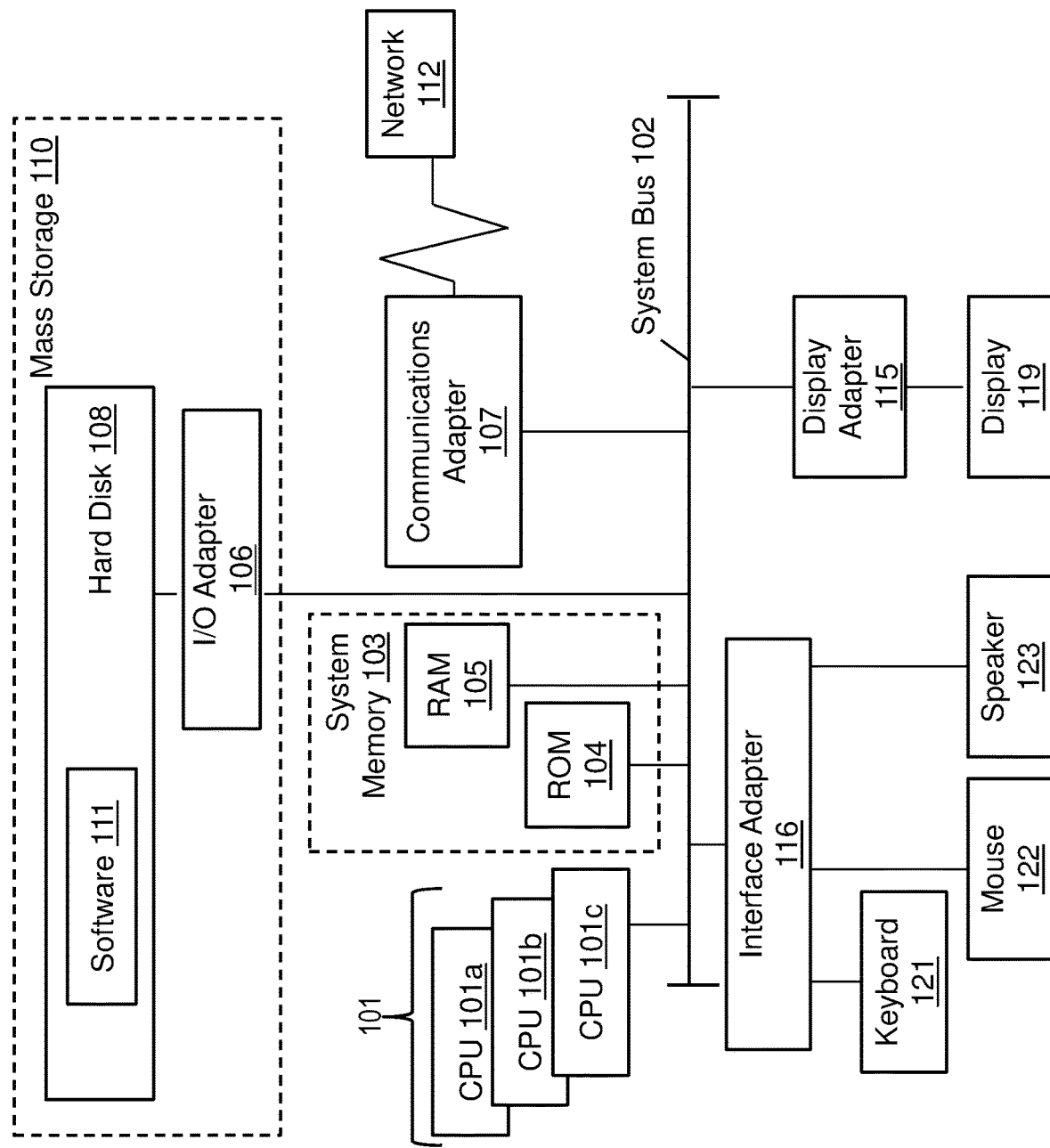
FIG. 1 depicts a block diagram of an example computer system for use in conjunction with one or more embodiments of the present invention.

One or more embodiments of the invention are configured to utilize a special tracking pool enhancement for core local cache (e.g., level one (L1) cache) address invalidates in an integrated circuit (IC). According to one or more embodiments of the invention, an invalidate queue is provided with one entry per shared (level three (L3)) controller. Additionally, the invalidate queue has the flexibility and performance of a floating queue with entries that can be used by any controller.

Symmetric multiprocessing or a symmetric multiprocessor (SMP) includes two or more identical processors sharing a single memory. The multiple processors may be separate chips or multiple cores on the same chip. In an SMP with a modified exclusive shared invalid (MESI) protocol, invalidates (XIs) must be made to the owning processor core of a line in a shared cache (e.g., L3 cache). Cores maintain a queue to hold these invalidate requests for processing. If the owning core has an exclusive copy of the line, that owning core must complete all stores before relinquishing the line of the shared cache, requiring an explicit invalidate response before the target line can be returned exclusive to another core. If the owning core has a read-only copy, no invalidate response is required, and the target line can be returned to another core as soon as the invalidate request is sent. For instance, if a processor owns the line exclusive, the controller issues a cross-interrogate that requires the processor to complete (any pending) stores, and the processor sends a response and gives up exclusivity. If the requestor of the cross-interrogate only wants the line read only and not exclusive, the processor demotes its copy of the line to read only versus vs giving the line up entirely, but the response is required even in that case.

A core invalidate queue with fewer entries than the number of hardware controllers that send invalidate requests requires hardware complexity to handle overflow cases. This hardware complexity can be avoided by having an invalidate queue depth equal to the number of invalidate launch controllers. However, invalidate queues may contain any combination of exclusive lines or read-only lines. Explicitly equating the queue depth to the number of controllers may artificially limit opportunities to invalidate read-only lines, thereby negatively impacting performance of the processor chip.

To address issues or to improve throughput rates for controllers that send or cause invalidates to be sent to L1 caches, one or more embodiments of the invention utilize a core invalidation queue with a depth that is larger than the number of L3 hardware controllers capable of sending invalidate requests by X number of entries. These X entries will be used as a specifically designated "special pool" such that entries in this special pool are for controllers handling operations for which a L3 directory lookup upon ingate of the controller reveals that the controller does not need to wait for a response back from the core to reset and be reloaded with the next incoming operation. As technical solutions and benefits, this allows the hardware controllers, which may be most performance critical, an additional opportunity to more efficiently handle lines the processor core owns read only without the additional logic overhead and cycle time risk inherent in supporting core invalidate queue overflow scenarios.

For the sake of brevity, conventional techniques related to semiconductor device and IC fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
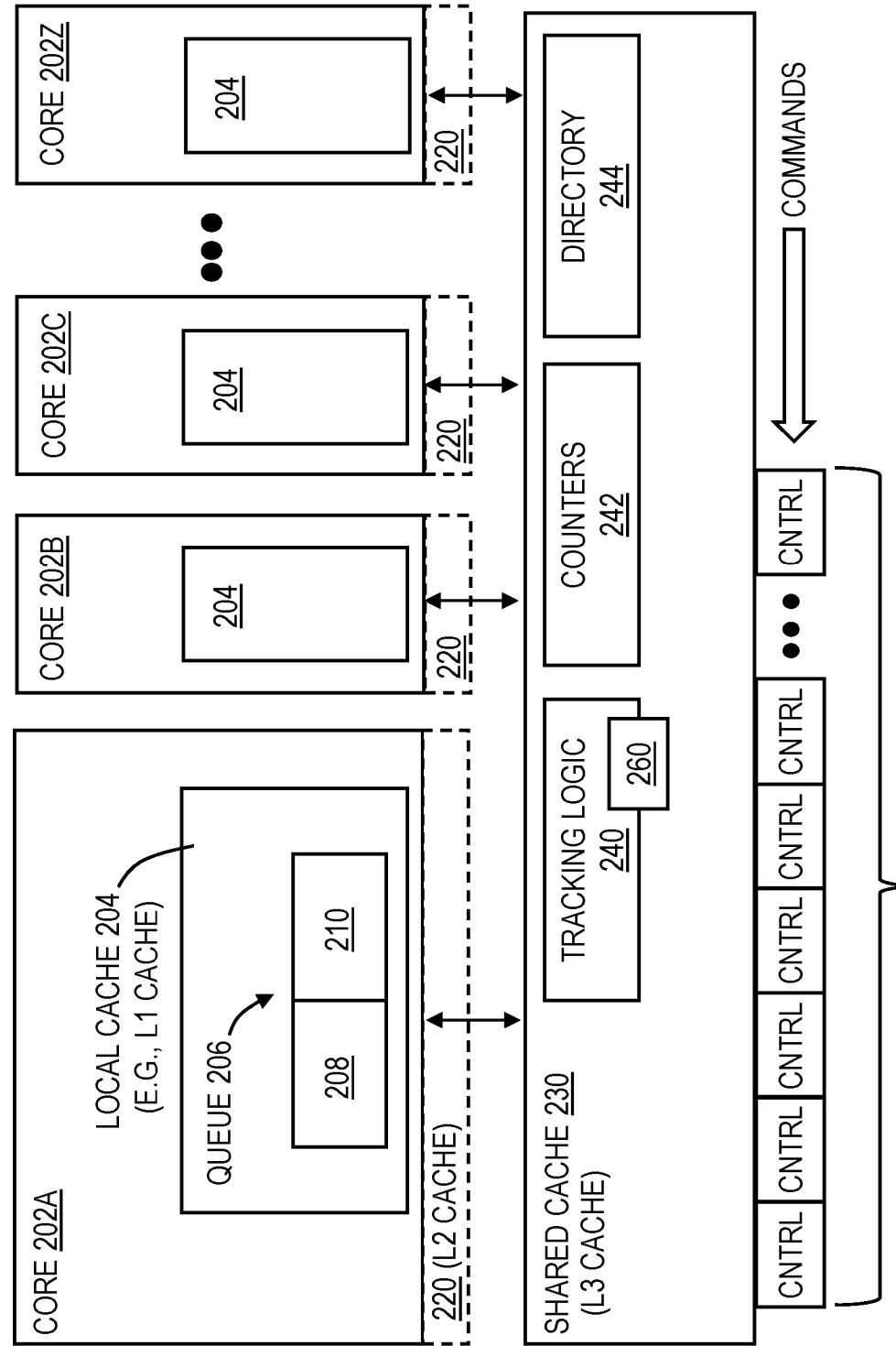
FIG. 2 depicts a block diagram of a processor chip using a special tracking pool enhancement for core local cache (e.g., level one (L1) cache) address invalidates according to one or more embodiments of the present invention.

FIG. 2 depicts a block diagram of a processor chip 200 configured and arranged to use special tracking pool enhancement for core L1 (e.g., L1 cache) address invalidates (e.g., invalidate requests) according to one or more embodiments of the invention. Computer system 100 may be integrated with and/or use processor chip 200 in FIG. 2. One or more processors 101 may use processor chip 200. The processor chip 200 or processor is an SNIP processor in which processor cores 202A-202Z share a shared cache, such as shared cache 230. Processor cores 202A-202Z can generally be referred to as processor cores 202 or simply cores, where processor core 202Z represents the last number of cores. Some examples may illustrate details of processor core 202A, but it should be understood that the details apply by analogy to the remaining processor cores 202B-202Z. The shared cache 230 may be an L3 cache, or in some cases, a level two (L2) cache.

The processor cores 202 include all the standard processing circuitry as understood by one of ordinary skill in the art. The processor cores 202 include a local cache 204, which may be representative of an instruction cache and/or a data cache. The local cache 204 is on the processor core 202 and/or closest to the processor core 202. The local cache 204 is typically referred to as an L1 cache. The local cache 204 includes an invalidate queue 206. The invalidate queue 206 includes two separate pools or allocation, a controller pool 208 and special pool 210, according to one or more embodiments of the invention. Additional information regarding the special pool 210, as well as the control pool 208, is described below.

In one or more embodiments, each processor core 202 may include and/or be coupled to a next closest cache 220, which is typically referred to as a L2 cache. The cache 220 is generally local to the processor core 202. The shared cache 230 is not local to the processor core 202 but is shared by processor cores 202A-202Z. In some cases when the cache 220 is not present, the shared cache 230 may be referred to as the L2 cache. The shared cache 230 can include and/or be coupled to various hardware controllers 250 in which the hardware controllers 250 are configured to control the shared cache 230 and cause invalidate requests to be sent to caches 220 (when present) and local caches 204 via the shared cache 230. The hardware controllers 250 are in and/or coupled to the shared cache 230 and control access (read, write, etc.) to the shared cache 230. When a core has ownership of a cache line in the shared cache 230 and when another core needs ownership of the same cache line in the shared cache 230, the hardware controller 250 can cause an invalidate request to be sent to the cache 220 (e.g., L2 cache) and local cache 204 (e.g., L1 cache) of the core having ownership as understood by one of ordinary skill in the art. The shared cache 230 may include and/or be coupled to tracking logic 240, counters 242, and a directory 244 (e.g., L3 directory). The tracking logic 240 is configured to track invalidate requests designated for the special pool 210 on behalf of the hardware controllers 250, send invalidate requests to be stored in the special pool 210, and ensure that criteria is met for using the special pool 210. One or more counters 242 are utilized to count the use of the special pool 210 per core, thereby maintaining an account of the number of invalidate requests in the special pool 210. The directory 244 is used to translate a command (e.g., a fetch) received by a hardware controller 250 into an appropriate invalidate request for the local cache 204. The process of searching the directory 244 may be referred to as an L3 directory lookup.

As noted above, core invalidate queue 206 has a depth that is X number of entries greater than the number of hardware controllers 250 capable of sending invalidate requests. The X number of entries is the total available slots in the special pool 210. When a hardware controller 250 has its invalidate request placed in the special pool 210, the hardware controller 250 does not need to wait for a response back from the core before the hardware controller 250 is able to shut off and start working on the next incoming command. Example incoming commands may include fetches, castout activities, and stores into the cache from input/output (TO) clients/accelerators, all of which trigger invalidates. Each of the hardware controllers 250 has one specific invalidate queue entry in the controller pool 208 in queue 206. A hardware controller 250 using this specific entry in the controller pool 208 may not reset/retire until that hardware controller 250 receives the invalidate response (even if the core only owned the line read-only).

According to one or more embodiments of the present invention, the remaining number of X entries in the special pool 210 may then strategically be utilized by a subset of the most performance sensitive hardware controllers 250. A performance sensitive hardware controller is a hardware controller 250 that is designed to handle certain operations where latency minimization and controller availability has the highest effect on overall system performance. In one or more embodiments, these are controllers that perform fetches, or most specifically and impactfully, fetches initiated from processor cores. Examples of performance sensitive hardware controllers 250 include central processor fetch controllers (CFARs) and remote fetch controllers (RFARs) according to one or more embodiments. CFARs are configured to handle local fetch requests, i.e., requests received directly from the interface of the processor attached to the cache. RFARs are configured to handle remote fetches from all sources in other caches, (i.e., fetches that did not hit in their local caches and are querying the other L3 cache (e.g., shared cache 230) instances in the system to determine if they have the line. In one or more embodiments, use of the special pool 210 may be limited to hits in particular (programmable) directory states. For example, if the L3 cache directory (e.g., directory 244) lookup reveals that a line is owned exclusive by a core, usage of the special pool may not be allowed. One or more embodiments may not allow use of the special pool if the line is owned exclusive by the shared cache, regardless of the state of the line in the core. Examples of controllers that are not permitted to use the special pool 210 may include controllers that perform background operations whose latency and throughput has less of an effect on system performance, such as, but not limited to castout/cache eviction or cache purging.

As noted above, example scenarios may utilize processor core 202A for illustration purposes, but the description applies by analogy to the remaining processor cores. There are generally three different types of invalidates (i.e., invalidate requests) to the processor core. These are the read-only invalidate, exclusive invalidate, and demote to read-only invalidate. The special pool 210 is reserved for hardware controllers 250 sending read-only invalidate requests. The type of invalidate to be sent is determined by the type of operation being performed and the results of the L3 directory (e.g., directory 244) lookup which reveal the ownership state of the line with respect to both the L1 and the L3 cache (e.g., local cache 204 and shared cache 230). It is noted that hardware controllers 250 working on lines where the processor core owns the line exclusive are not allowed to use the special pool 210 and are required to always wait for the invalidate response back from the local cache 204 (e.g., L1 cache). The special pool 210 uses a unique/special identification (e.g., a codepoint) as the requester identification when receiving an invalidate for the processor core 202A to let the core know that the invalidate request is for the special pool 210. The processor core 202A echoes this special identification back when processing a special pool entry in order for the tracking logic 240 to update tracking of the number of outstanding special pool invalidates in the counter 242. When a hardware controller 250 receives a command and the hardware controller 250 hits in the shared cache 230 (e.g., L3 cache) in a state that may send a read-only invalidate, the hardware controller 250 can be flagged as being able to use the special pool 210.

A counter 242 keeps track of the outstanding invalidates (i.e., read-only invalidates) using the special pool 210. The counter 242 via tracking logic 240 will block the hardware controllers 250 from using the special pool 210 when the tracking logic 240 determines that the estimate count gets too close to overflowing the special pool 210. As such, the tracking logic 240 then forces the hardware controllers 250 to use the controller pool 208 even if the hardware controllers 250 met the criteria for using the special pool 210. In some cases, the tracking logic 240 blocks use of the special pool 210 when the counter 242 for the special pool is a zero, which means that all entries are being utilized in the special pool 210. The counter 242 can start at a value X where the value X matches the X number of entries in the special pool 210. When the hardware controller 250 receives a command from a core, an application, another processor chip, etc., the hardware controller 250 may search a directory 244 to determine the type of invalidate request that needs to be sent to the local cache 204 on processor core 202A in order to invalidate the line. When the hardware controller 250 determines that invalidate request is a read-only invalidate request, tracking logic 240 determines that the read-only invalidate request is eligible for the special pool 210 and determines that the hardware controller 250 is an eligible controller to use the special pool 210. Because the criteria of being a read-only invalidate request and an eligible hardware controller 250 have been met, the tracking logic 240 is configured to decrement the counter 242 by one to account for one entry in the special pool 210 being filled and then send the read-only invalidate request with a special identification to the local cache 204 of processor core 202A. The special identification is a tag that identifies the read-only invalidate request as an entry for the special pool 210 and not the controller pool 208 in queue 206. A different value is utilized for the requester identification in order to designate that an invalidate request is to be stored in the controller pool 208.

This enables performance sensitive hardware controllers (such as CFAR and RFAR hardware controllers) to reset and start working on the next command without waiting for the L1 cache to send a response back that the invalidate request has been processed, according to one or more embodiments of the invention. The special pool is limited to use for specific performance sensitive hardware controllers, thereby improving the performance of these commands that utilize these controllers. As technical solutions and benefits, one or more embodiments are configured to keep the L3 cache moving to process fetches more quickly than having to wait for the L1 cache to respond back, especially if the L1 cache is trying to process a high volume of invalidate requests.

Figure 3:
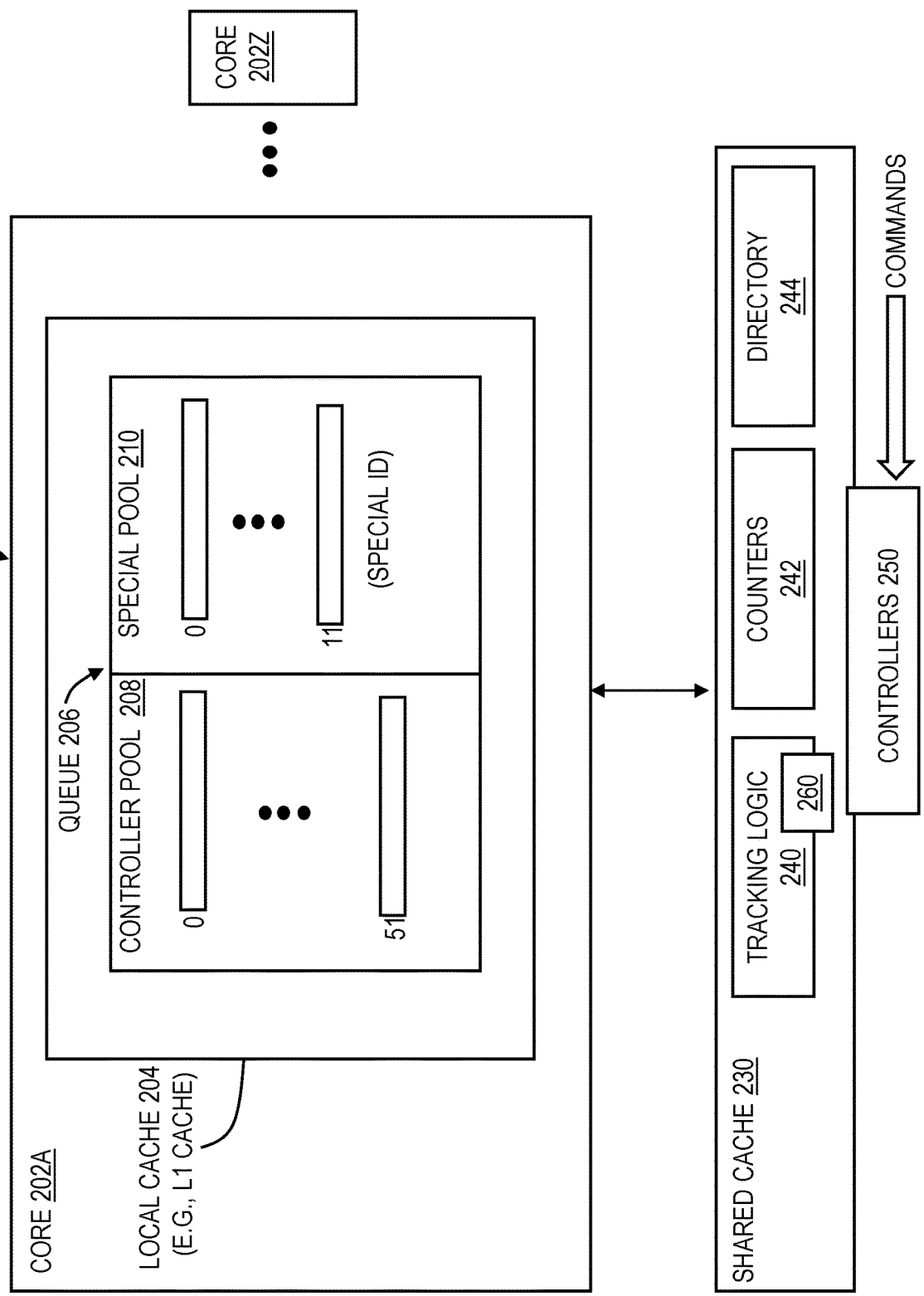
FIG. 3 depicts a block diagram of the processor chip illustrating further details using the special tracking pool enhancement for core local cache (e.g., L1 cache) address invalidates according to one or more embodiments of the present invention.

FIG. 3 depicts a block diagram of the processor chip 200 providing further details of using the special tracking pool enhancement for core L1 address invalidates (e.g., invalidate requests) according to one or more embodiments of the invention. Some elements of FIG. 2 are omitted so as not to obscure the figure. It is noted that the new design to handle read-only invalidate requests to the processor core does not require use of the invalidate pending vector.

For illustration purposes and not limitation, FIG. 3 depicts the queue 206 (sometimes referred to as a bias stack) as having a depth of 64 (e.g., 64 entries/slots), where the total number of hardware controllers 250 on the shared cache 230 (e.g., L3 cache) that can perform an invalidate (i.e., invalidate request) is 52 such as, for example, 4 CFAR hardware controllers, 12 RFAR hardware controllers, 12 L-LSAR (line local store address register controller) hardware controllers, 12 R-LSAR (remote local store address register controller) hardware controllers, and 12 RSAR (remote store address controller) hardware controllers. In FIG. 3, the controller pool 208 is shown with 52 entries illustrated as entry 0 though entry 51. This allows the queue 206 to have an extra 12 entries for the special pool 210, which represent X extra entries in this example scenario. Since there is space for an invalidate for every hardware controller 250 in the controller pool 208, the tracking logic 240 does not need to reject any invalidate requests coming from active controllers.

As further regarding controller pool 208, the controller pool 208 is the main set of 52 entries, one for each hardware controller. Controllers going into this pool will have to wait for the read-only response (or bias normal/reject response) from the core in order to go invalid or retire. For the controller pool 208, the tracking logic 240 sends a requester identification for each of the hardware controllers 250 with the invalid request to the local cache 204 and also sends the controllers a signal that lets each hardware controller 250 know it has to wait for a response before shutting down (i.e., before retiring/resetting to be used for another command). The hardware controller 250 receives its requester identification back with the read-only invalidate response field (or bias normal/reject response) so the hardware controller 250 knows that its invalidate request was processed. LSAR and RSAR hardware controllers 250 will (only ever) use the controller pool 208. CFAR and RFAR hardware controllers 250 may use the controller pool 208 but will start out using the special pool 210 until the entries in the special pool 210 are filled up. Special pool usage is limited to read-only invalidates or read-only invalidate requests, because read-only invalidates are always processed and the hardware controller 250 does not need to wait to see if the read-only invalidate is accepted or rejected by the local cache 204 of processor core 202A. The controller pool 208 has one entry for each hardware controller per slice in the shared cache 230. Once the controller pool 208 is full, that means that all hardware controllers 250 are currently in use and waiting for an invalidate response, thus no new invalidates can be sent. No special signals need to be driven from the tracking logic 240 to indicate that the controller pool 208 is full. Any type of invalidate being sent by a hardware controller may occupy a slot in the controller pool 208. The controller pool 208 is for all types of invalidate requests, unlike the special pool 210.

As further regarding special pool 210, the special pool 210 is reserved only for performance sensitive hardware controllers 250, which in one or more embodiments are (only) CFAR and RFAR hardware controllers 250, where the line is owned in the shared cache 230 (e.g., L3 cache) non-exclusive. Because of this, the (only) type of invalidates that are tracked by the tracking logic 240 in the special pool 210 are read-only invalidate requests. The tracking logic 240, which may be hardware logic, is configured to determine if the hardware controller 250 is a performance sensitive hardware controllers, like CFAR and RFAR hardware controllers 250. For example, the tracking logic 240 could maintain a table 260 of the types of hardware controllers 250, and the table 260 is checked each time a hardware controller 250 has an invalidate request. In one or more embodiments, the table 260 could be replaced with configurable hardware latches to designate which controller types should be considered 'performance sensitive' hardware controllers. Each controller type has its own unique requestor identification, so the tracking logic 240 can use that requestor identification during the L3 directory (e.g., directory 244) lookup pipe pass to determine if that requestor identification range is designated as 'performance sensitive' based on the state of the configurable latches. In one or more embodiments, each type of hardware controller 250 could be physically different. The tracking logic 240 is configured to check if the line is non-exclusive (i.e., L3 non-exclusive) in the shared cache 230, which helps to alleviate timing paths so the processor chip 200 does not need to check the L1 state in the critical path of determining whether to use the special pool. Instead, the hardware controller 250 can check the main directory outputs of directory 244 earlier and stage as needed. These performance hardware controllers 250 (e.g., CFAR hardware controllers and RFAR hardware controllers) are the controllers that in one or more embodiments are configured to prevent from being held up waiting for a read-only invalidate response, and this allows the performance hardware controllers 250 to retire and allow another command to come in for processing by the hardware controllers 250. Moreover, CFAR hardware controllers and RFAR hardware controllers can retire and get ingated again with a new command even if there is an outstanding read-only invalidate request for their old command. Retiring hardware controller 250 (e.g., a CFAR hardware controller, RFAR hardware controller, etc.) from an old command to process a new command before receiving a read-only invalidate response corresponding to the old command from the local cache 204 is permitted in the processor chip 200; because the processor core 202A has to process the read-only invalidate request, the processor chip 200 knows the read-only invalidate request will be processed at some point. CFAR hardware controllers and RFAR hardware controllers will continue to use this special pool 210, sometimes with the same RFAR or CFAR taking up multiple entries in the special pool 210. The special pool 210 is configured to fill up first with CFAR and RFAR hardware controllers before the processor chip 200 starts using the controller pool 208 for CFAR and RFAR hardware controllers.

Before allowing a hardware controller 250 to use the special pool 210 in queue 206, the tracking logic 240 may confirm/check that the following criteria is met: the hardware controller needs to be a special performance hardware controller such as a CFAR or RFAR hardware controller, the line requested by the hardware controller needs to be owned in the shared cache (L3 cache) non-exclusive, the hardware controller is requesting to send an invalidate request (i.e., invalidate), and using the special pool 210 will not overflow the special pool stack counter 242 (i.e., the counter 242 is not zero). In one or more embodiments, the hardware controller 250 may contain logic to confirm that the hardware controller 250 meets the criteria to use the special pool 210.

Once a hardware controller 250 is permitted to use the special pool 210, the following actions occur in the processor chip 200. The tracking logic 240 sends the read-only invalidate request to the core (e.g., processor core 202A), which the local cache 204 is configured to store in the special pool 210 based on recognizing the special identification as the requester identification. The tracking logic 240 sends an indication to the hardware controller 250 to inform the hardware controller 250 that the read-only invalidate was sent and that hardware controller 250 does not have to wait for a response from the processor core 202A. The tracking logic 240 will decrement the counter 242 from its maximum value X (where X which is the total number of available entries in the special pool 210) to keep track of how many outstanding invalidates are in the special pool 210. The counter 242 may be at some count less than the maximum number of available entries X when other invalidate requests are already in the special pool 210. The hardware controller 250 (e.g., CFAR or RFAR hardware controller) can continue on in its sequence and not wait for a read-only invalidate response from local cache 204 of processor core 202A. The hardware controller 250 is configured to retire/reset once it is has completed whatever else it needs to do. However, the tracking logic 240 is configured to wait for a read-only response with a shared cache (L3) requester identification of "0x7F" to indicate the read-only invalidate request that the processor core 202A is responding to was from the special pool 210, and the tracking logic 240 is configured to increment the (special pool) counter 242.

To determine when to stop using the special pool 210 and when to switch to having each performance sensitive hardware controller 250 (e.g., CFAR or RFAR hardware controller) use the normal controller pool 208, which will require the hardware controller 250 to wait for read-only invalidate responses, there is a similar bias stack "overflow" counting to what already exists in the tracking logic 240. The tracking logic 240 is configured to track that an invalidate request for a performance hardware controller 250 (e.g., CFAR or RFAR hardware controller) is sent out to the local cache 204 and that the invalidate request is using the special pool 210. When sent out to the local cache 204, the tracking logic 240 changes the local requester identification to a flag value, in this example case "0x7F". By changing the location requester identification, this triggers the tracking logic 240 to decrement the special pool counter 242. When the tracking logic 240 receives the read-only invalidate response back and the tracking logic 240 recognizes a requestor identification of "0x7F", the tracking logic 240 determines that the read-only invalidate response is for a read-only invalidate request that originated from the special pool 210, and this causes the tracking logic 240 to increment the counter 242 and let more hardware controllers 250 (e.g., CFAR and RFAR hardware controllers) use the special pool 210. The tracking logic 240 is configured to determine that the counter 242 will overflow if the special pool 210 in local cache 204 (which could be either the instruction cache or data cache) will overflow. When the tracking logic 240 notices that the special pool 210 will overflow, the tracking logic 240 is configured make whatever commands in the pipeline use the controller pool 208 and make those hardware controllers 250 wait for the read-only invalidate response before they can go away (i.e., retire).

FIG. 4A is a flowchart of a process 400 for using the special tracking pool enhancement for core L1 address invalidates (e.g., invalidate requests) according to one or more embodiments of the invention. The process 400 is performed by the processor chip 200.

At block 402 of the process 400, a hardware controller 250 of the shared cache 230 is configured to receive a command from a processor core (e.g., processor cores 202B-202Z), an application, another processor chip (e.g., identical or nearly identical to processor chip 200), etc. The command can be a fetch command for the shared cache 230 which in turn requires an invalidate request to be sent to the local cache 204 of processor core 202A.

At block 404, the hardware controller 250 is configured to search the directory 244 to determine the type of invalidate request to be used for the command. In some cases, the hardware controller 250 may already know the type of invalidate request that is required for the command. The hardware controller 250 is configured to communicate with tracking logic 240 of the shared cache 230 in order to inform the tracking logic 240 that an invalidate request is ready for the cache line in the local cache 204 of processor core 202A. The command received by the hardware controller 250 is for a particular cache line in the local cache 204, which has a corresponding cache line in the shared cache 230. The command may instruct the hardware controller 250 to perform an operation on and/or associated with (e.g., read, write, etc.) the particular cache line in the local cache 204.

At block 406, the tracking logic 240 is configured to check whether both the invalidate request and the requesting hardware controller 250 meet criteria for using the special pool 210 in queue 206 of the local cache 204. If not, the tracking logic 240 processes the invalidate request for the hardware controller 250 using the controller pool 208 at block 408. Block 408 is described below in FIG. 4B.

At block 410, when the invalidate request is a read-only invalidate request and the hardware controller 250 making the read-only invalidate request is one designated as a performance sensitive hardware controller, the tracking logic 240 is configured to check the counter 242 for the special pool 210 to determine if an entry is available in the special pool 210 for the new read-only invalidate request. The tracking logic 240 may check if the counter 242 for available entries in the special pool 210 has reached zero. If an entry is not available in the special pool 210, the tracking logic 240 is configured to process the invalidate request to use the controller pool at block 408.

At block 412, if the counter 242 has not reached zero, the tracking logic 240 is configured to select a special identification as the requester identification (e.g., tag) for the invalidate request, where the special identification (e.g., "0x7F") indicates that the special pool 210 is the location for storing the invalidate request.

At block 414, the tracking logic 240 is configured to send to the local cache 204 the invalidate request for the hardware controller 250 with the special identification (e.g., a special value) as the requester identification and decrement the counter 242 for the special pool 210.

At block 416, the tracking logic 240 is configured to release or retire the hardware controller 250 from the previous command causing the invalidate request, such that the hardware controller 250 is in a state available for use by a subsequent command. The tracking logic 240 may set and/or cause a flag/bit to be set in hardware controller 250 to indicate that the hardware controller 250 is available for another command. The hardware controller 250 may have to complete one or more operations before retiring but the hardware controller 250 does not have to wait for an invalidate request response back from the local cache 204.

At block 418, upon receiving an invalidate response back from the local cache 204 with the special identification as the requester identification, the tracking logic 240 is configured to increment the counter 242. It is noted that each processor core 202 has its own counter 242 for tracking the respective special pool 210 for the processor core 202.

FIG. 4B is a flowchart of a process 450 for using the control pool 208 for core L1 address invalidates (e.g., invalidate requests) according to one or more embodiments of the invention. FIG. 4B further details operations in block 408. The process 450 is performed by the processor chip 200.

At blocks 420, 422, the tracking logic 240 is configured to use a controller-unique identifier (e.g., identifying the requesting hardware controller 250) for the new invalidate request and send the invalidate request to the controller pool 208. At blocks 424, 426, the tracking logic 240 is configured to wait to receive a response back from the local cache 204 with the controller-unique identifier and then release/retire the hardware controller 250 based at least in part on receiving the response with the controller-unique identifier.

Figure 5:
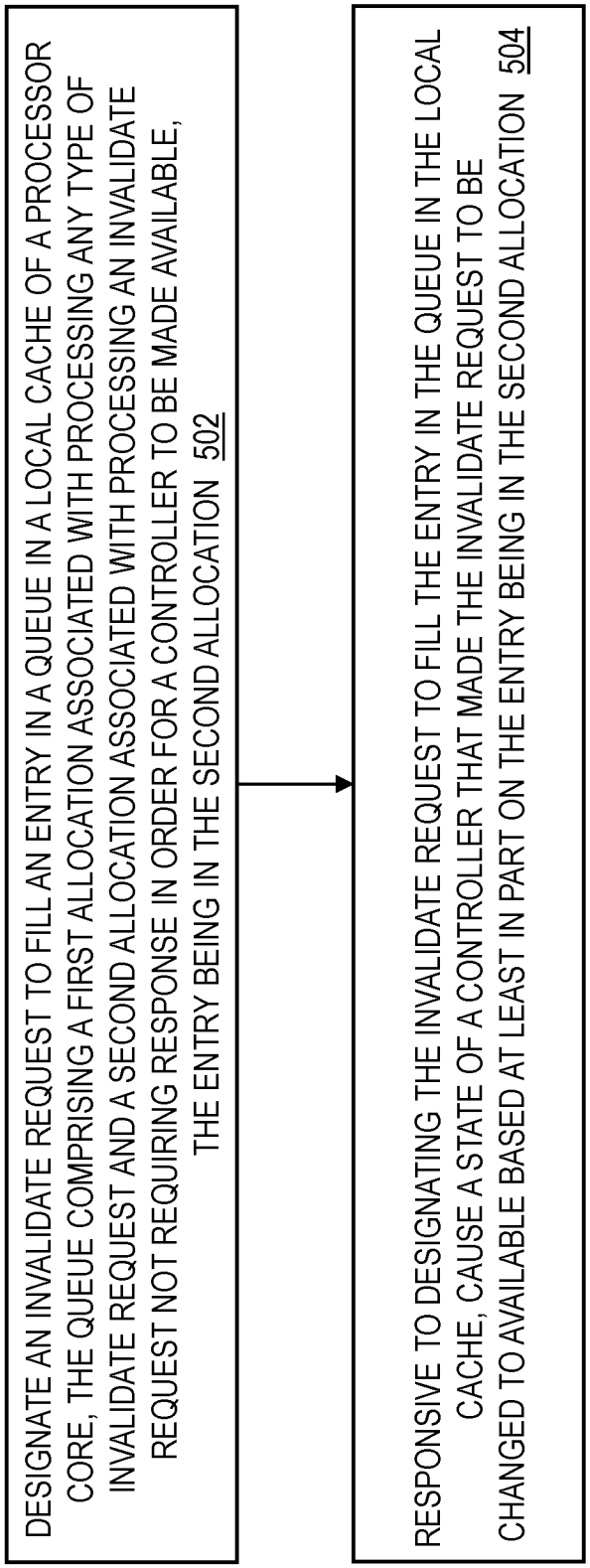
FIG. 5 is a flowchart of a computer-implemented method for using the special tracking pool enhancement for core local cache (e.g., L1 cache) address invalidates in the processor core according to one or more embodiments of the present invention.

FIG. 5 is a flowchart of a computer-implemented method 500 for using a special tracking pool enhancement for core L1 address invalidates according to one or more embodiments. Reference can be made to FIGS. 1-4.

At block 502, the tracking logic 240 is configured to designate an invalidate request to fill an entry in a queue 206 in a local cache 204 of a processor core 202A, the queue 206 comprising a first allocation (e.g., controller pool 208) associated with processing any type of invalidate request and a second allocation (e.g., special pool 210) associated with (and exclusive to use for) processing an invalidate request not requiring a response from the core (e.g., processor core 202A) in order for a hardware controller 250 to be made available, the entry being in the second allocation (e.g., special pool 210) based at least in part on the entry being in the second allocation.

At block 504, responsive to designating the invalidate request to fill the entry in the queue 206 in the local cache 204, the tracking logic 240 is configured to cause a state of the hardware controller 250 that made the invalidate request to be changed to available. For example, the hardware controller 250 is available because it has been reset or retired from the old command and is ready for a new command.

The second allocation (e.g., special pool 210) in the queue 206 is exclusively used for read-only invalidate requests. The first allocation (e.g., controller pool 208) in the queue 206 comprises a total number of entries (e.g., entries/slots 0-51 in FIG. 3), the total number of entries being equal to a number of all controllers (e.g., all hardware controllers 250) given access to or in a shared cache 230; and a value in a tag is utilized to identify that a corresponding invalidate request for a given hardware controller is for a given entry in the first allocation.

Responsive to a shared cache 230 (e.g., tracking logic 240) determining that the second allocation in the queue 206 is not available, a subsequent invalidate request fills another entry in the first allocation (e.g., controller pool 208) and a state of another controller (e.g., another hardware controller 250 in addition to the given hardware controller 250) that made the subsequent invalidate request is busy until a response is received from the local cache 204.

A first value (e.g., a special identification such as, for example, "0X7F") in a tag is utilized to identify that the invalidate request is for the entry in the second allocation (e.g., special pool 210) and a different value (different from the special identification) is utilized for the first allocation (e.g., controller pool 208).

The first allocation (e.g., controller pool 208) comprises a first plurality of entries (e.g., entries/slots 0-51 in FIG. 3) and the second allocation (e.g., special pool 210) comprises a second plurality of entries (e.g., entries/slots 1-11) different from the first plurality of entries. The state of available for the controller (e.g., given hardware controller 250) permits the controller to perform operations for a subsequent invalidate request, without waiting for a response to the invalidate request back from the local cache 204. The second allocation (e.g., special pool 210) is exclusive to controllers designated as performance controllers (e.g., performance hardware controllers 250). Examples of performance sensitive hardware controllers 250 that can use the special pool 210 include central processor fetch controllers (CFARs) and remote fetch controllers (RFARs) according to one or more embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
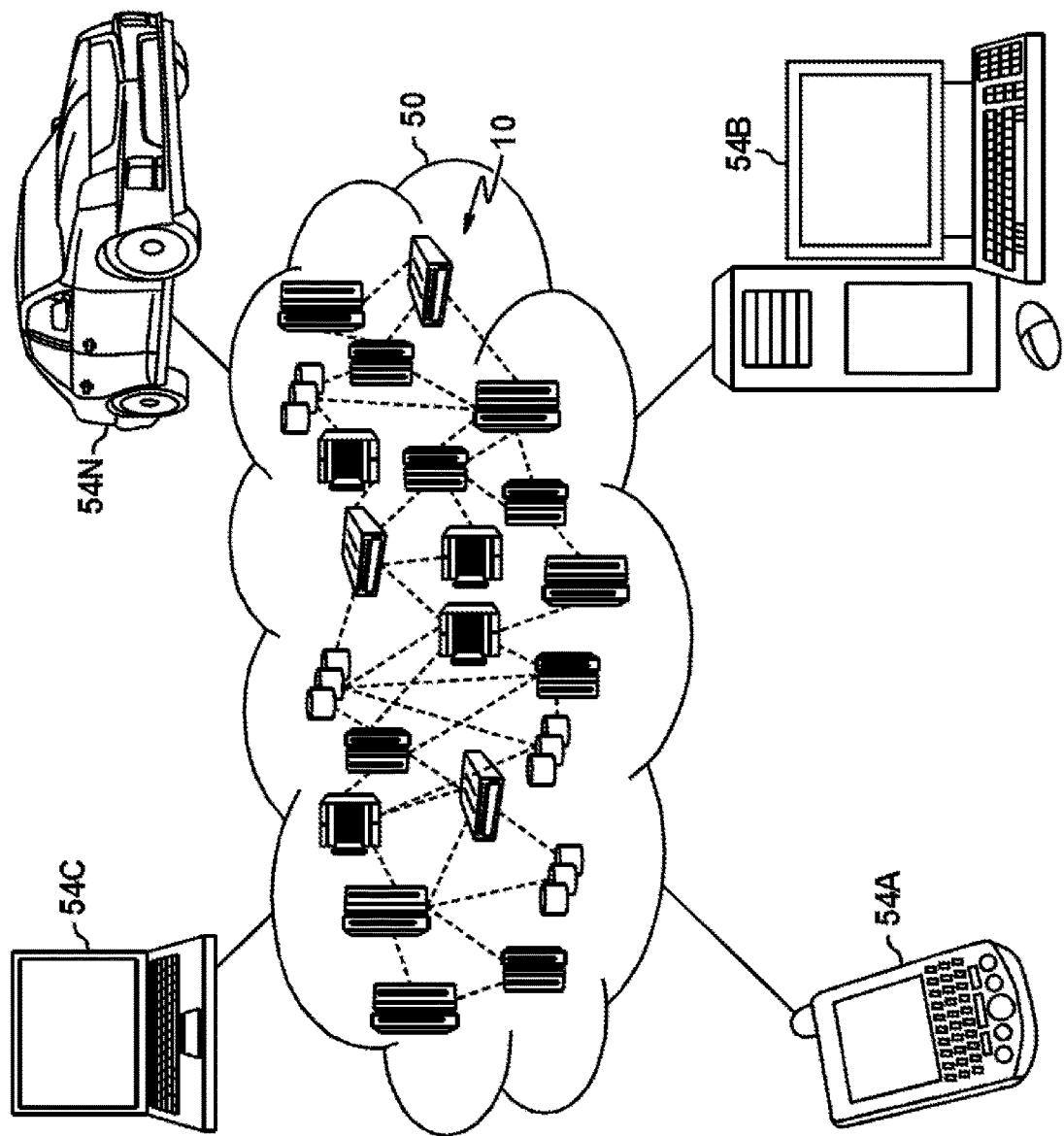
FIG. 6 depicts a cloud computing environment according to one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
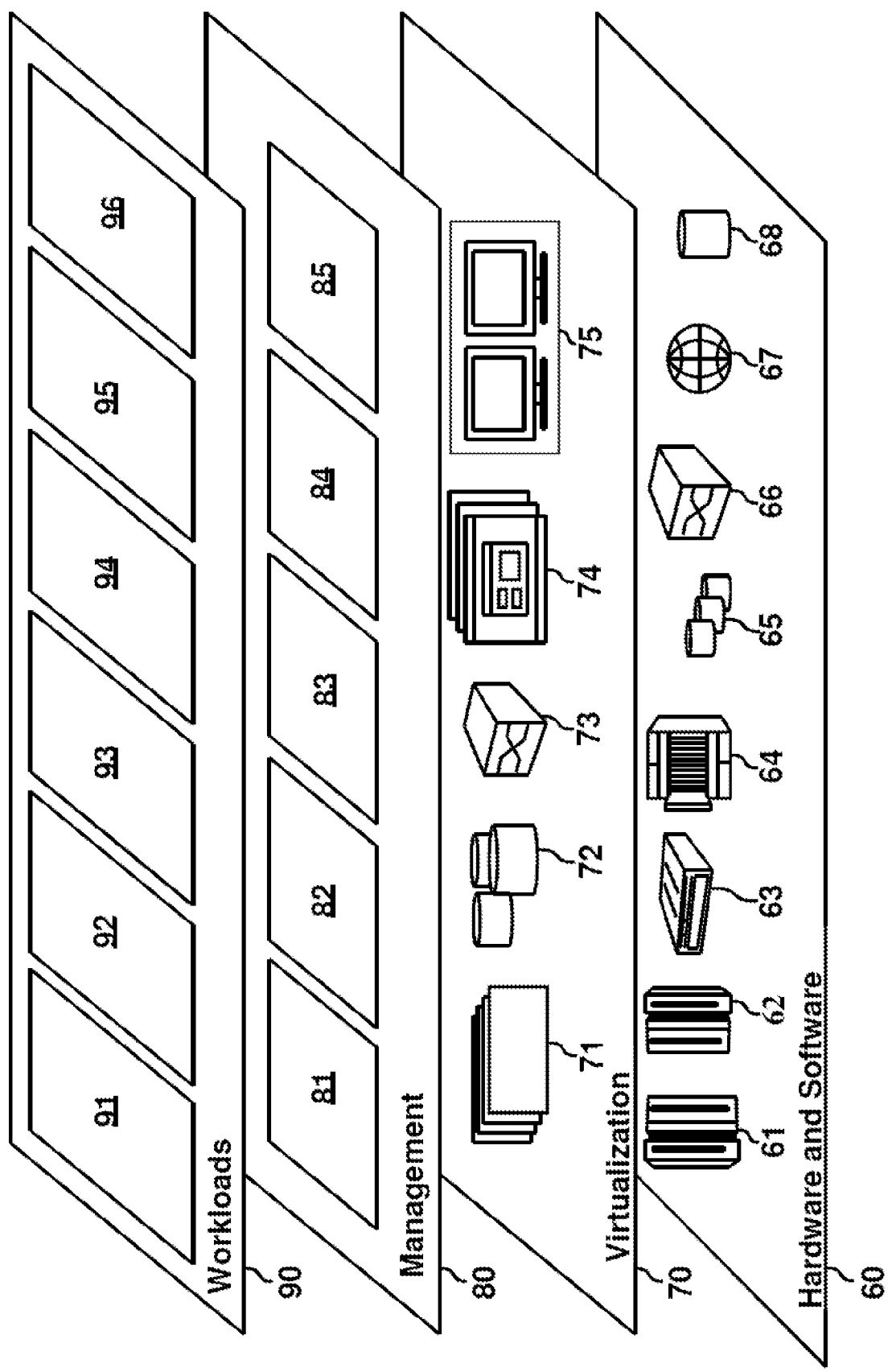
FIG. 7 depicts abstraction model layers according to one or more embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In one or more embodiments, the hardware components can include one or more processor chips 200 discussed herein.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

FIG. 8 is a block diagram of a system 800 according to embodiments of the invention. The system 800 includes processing circuitry 810 used to generate the design 830 that is ultimately fabricated into an integrated circuit 820 (e.g., processor chips 200), which uses special tracking pool enhancement for core L1 address invalidates. The steps involved in the fabrication of the integrated circuit 820 are well-known and briefly described herein. Once the physical layout 840 is finalized, based, in part, on being configured to use the special tracking pool enhancement for core L1 address invalidates according to embodiments of the invention, the finalized physical layout 840 is provided to a foundry. Masks are generated for each layer of the integrated circuit based on the finalized physical layout. Then, the wafer is processed in the sequence of the mask order. The processing includes photolithography and etch. This is further discussed with reference to FIG. 9.

FIG. 9 is a process flow of a method of fabricating the integrated circuit according to exemplary embodiments of the invention. Once the physical design data is obtained, based, in part, on using special tracking pool enhancement for core L1 address invalidates in the processor chip 200, the integrated circuit 820 can be fabricated according to known processes that are generally described with reference to FIG. 9. Generally, a wafer with multiple copies of the final design is fabricated and cut (i.e., diced) such that each die is one copy of the integrated circuit 820. At block 910, the processes include fabricating masks for lithography based on the finalized physical layout. At block 920, fabricating the wafer includes using the masks to perform photolithography and etching. Once the wafer is diced, testing and sorting each die is performed, at block 930, to filter out any faulty die.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The phrase "selective to," such as, for example, "a first element selective to a second element," means that the first element can be etched and the second element can act as an etch stop.

As used herein, "p-type" refers to the addition of impurities to an intrinsic semiconductor that creates deficiencies of valence electrons. In a silicon-containing substrate, examples of p-type dopants, i.e., impurities, include but are not limited to: boron, aluminum, gallium and indium.

As used herein, "n-type" refers to the addition of impurities that contributes free electrons to an intrinsic semiconductor. In a silicon containing substrate examples of n-type dopants, i.e., impurities, include but are not limited to antimony, arsenic and phosphorous.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device.

As noted above, atomic layer etching processes can be used in the present invention for via residue removal, such as can be caused by via misalignment. The atomic layer etch process provide precise etching of metals using a plasma-based approach or an electrochemical approach. The atomic layer etching processes are generally defined by two well-defined, sequential, self-limiting reaction steps that can be independently controlled. The process generally includes passivation followed selective removal of the passivation layer and can be used to remove thin metal layers on the order of nanometers. An exemplary plasma-based approach generally includes a two-step process that generally includes exposing a metal such a copper to chlorine and hydrogen plasmas at low temperature (below 20° C.). This process generates a volatile etch product that minimizes surface contamination. In another example, cyclic exposure to an oxidant and hexafluoroacetylacetone (Hhfac) at an elevated temperature such as at 275° C. can be used to selectively etch a metal such as copper. An exemplary electrochemical approach also can include two steps. A first step includes surface-limited sulfidization of the metal such as copper to form a metal sulfide, e.g., $Cu_2S$, followed by selective wet etching of the metal sulfide, e.g., etching of $Cu_2S$ in HCl. Atomic layer etching is relatively recent technology and optimization for a specific metal is well within the skill of those in the art. The reactions at the surface provide high selectivity and minimal or no attack of exposed dielectric surfaces.

Semiconductor lithography is the formation of three-dimensional relief images or patterns on the semiconductor substrate for subsequent transfer of the pattern to the substrate. In semiconductor lithography, the patterns are formed by a light sensitive polymer called a photoresist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The photoresist can be formed using conventional deposition techniques such chemical vapor deposition, plasma vapor deposition, sputtering, dip coating, spin-on coating, brushing, spraying and other like deposition techniques can be employed. Following formation of the photoresist, the photoresist is exposed to a desired pattern of radiation such as X-ray radiation, extreme ultraviolet (EUV) radiation, electron beam radiation or the like. Next, the exposed photoresist is developed utilizing a conventional resist development process.

After the development step, the etching step can be performed to transfer the pattern from the patterned photoresist into the interlayer dielectric. The etching step used in forming the at least one opening can include a dry etching process (including, for example, reactive ion etching, ion beam etching, plasma etching or laser ablation), a wet chemical etching process or any combination thereof.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising: designating an invalidate request to fill an entry in a queue in a local cache of a processor core, the queue comprising a first allocation associated with processing any type of invalidate request and a second allocation associated with processing an invalidate request not requiring a response in order for a controller to be made available, the entry being in the second allocation, wherein the queue comprises the first allocation for the invalidate request and the second allocation for the invalidate request within the processor core; and
   responsive to designating the invalidate request to fill the entry in the queue in the local cache, causing a state of the controller that made the invalidate request to be changed to available based at least in part on the entry being in the second allocation.

2. The computer-implemented method of claim 1, wherein the second allocation in the queue is exclusively used for read-only invalidate requests.

3. The computer-implemented method of claim 1, wherein:
   the first allocation in the queue comprises a total number of entries, the total number of entries being equal to a number of all controllers given access to a shared cache; and
   a value in a tag is utilized to identify that a corresponding invalidate request for a given controller is for a given entry in the first allocation.

4. The computer-implemented method of claim 1, wherein, responsive to a shared cache determining that the second allocation in the queue is not available, a subsequent invalidate request fills another entry in the first allocation and a state of another controller that made the subsequent invalidate request is busy until a response is received from the local cache.

5. The computer-implemented method of claim 1, wherein a first value in a tag is utilized to identify that the invalidate request is for the entry in the second allocation and a different value is utilized for the first allocation.

6. The computer-implemented method of claim 1, wherein:
   the first allocation comprises a first plurality of entries and the second allocation comprises a second plurality of entries different from the first plurality of entries; and
   the state of available for the controller permits the controller to perform operations for a subsequent invalidate request, without waiting for a response to the invalidate request from the local cache.

7. The computer-implemented method of claim 1, wherein the second allocation is exclusive to use by controllers designated as performance hardware controllers, the performance hardware controllers being selected from the group consisting of a central processor fetch controller (CFAR) and a remote fetch controller (RFAR).

8. A system comprising: a memory having computer readable instructions; and
   one or more processors for executing the computer readable instructions, the computer readable instructions controlling the one or more processors to perform operations comprising:
   designating an invalidate request to fill an entry in a queue in a local cache of a processor core, the queue comprising a first allocation associated with processing any type of invalidate request and a second allocation associated with processing an invalidate request not requiring a response in order for a controller to be made available, the entry being in the second allocation, wherein the queue comprises the first allocation for the invalidate request and the second allocation for the invalidate request within the processor core; and
   responsive to designating the invalidate request to fill the entry in the queue in the local cache, causing a state of the controller that made the invalidate request to be changed to available based at least in part on the entry being in the second allocation.

9. The system of claim 8, wherein the second allocation in the queue is exclusively used for read-only invalidate requests.

10. The system of claim 8, wherein:
    the first allocation in the queue comprises a total number of entries, the total number of entries being equal to a number of all controllers given access to a shared cache; and
    a value in a tag is utilized to identify that a corresponding invalidate request for a given controller is for a given entry in the first allocation.

11. The system of claim 8, wherein, responsive to a shared cache determining that the second allocation in the queue is not available, a subsequent invalidate request fills another entry in the first allocation and a state of another controller that made the subsequent invalidate request is busy until a response is received from the local cache.

12. The system of claim 8, wherein a first value in a tag is utilized to identify that the invalidate request is for the entry in the second allocation and a different value is utilized for the first allocation.

13. The system of claim 8, wherein:
    the first allocation comprises a first plurality of entries and the second allocation comprises a second plurality of entries different from the first plurality of entries; and
    the state of available for the controller permits the controller to perform operations for a subsequent invalidate request, without waiting for a response from the local cache to the invalidate request.

14. The system of claim 8, wherein the second allocation is exclusive to use by controllers designated as performance controllers, the performance hardware controllers being selected from the group consisting of a central processor fetch controller (CFAR) and a remote fetch controller (RFAR).

15. A computer program product comprising a computer readable storage medium having program instructions embodied therewith, the program instructions executable by one or more processors to cause the one or more processors to perform operations comprising:

designating an invalidate request to fill an entry in a queue in a local cache, the queue comprising a first allocation associated with processing any type of invalidate request and a second allocation associated with processing an invalidate request not requiring a response in order for a controller to be made available, the entry being in the second allocation, wherein the queue comprises the first allocation for the invalidate request and the second allocation for the invalidate request within the processor core; and responsive to designating the invalidate request to fill the entry in the queue in the local cache, causing a state of the controller that made the invalidate request to be changed to available based at least in part on the entry being in the second allocation.

16. The computer program product of claim 15, wherein the second allocation in the queue is exclusively used for read-only invalidate requests.

17. The computer program product of claim 15, wherein:
the first allocation in the queue comprises a total number of entries, the total number of entries being equal to a number of all controllers given access to a shared cache; and
a value in a tag is utilized to identify that a corresponding invalidate request for a given controller is for a given entry in the first allocation.

18. The computer program product of claim 15, wherein, responsive to a shared cache determining that the second allocation in the queue is not available, a subsequent invalidate request fills another entry in the first allocation and a state of another controller that made the subsequent invalidate request is busy until a response is received from the local cache.

19. The computer program product of claim 15, wherein a first value in a tag is utilized to identify that the invalidate request is for the entry in the second allocation and a different value is utilized for the first allocation.

20. The computer program product of claim 15, wherein:
the first allocation comprises a first plurality of entries and the second allocation comprises a second plurality of entries different from the first plurality of entries; and
the state of available for the controller permits the controller to perform operations for a subsequent invalidate request, without waiting for a response to the invalidate request from the local cache.

\* \* \* \* \*